United States Patent [19]
Lindgren et al.

[11] Patent Number: 6,157,656
[45] Date of Patent: Dec. 5, 2000

[54] METHOD AND ARRANGEMENT FOR DYNAMIC SIGNALLING

[75] Inventors: Per Lindgren; Christer Bohm, both of Stockholm; Lars Gauffin, Rönninge; Lars Ramfelt, Kista, all of Sweden

[73] Assignee: Net Insight AB, Stockholm, Sweden

[21] Appl. No.: 08/952,410

[22] PCT Filed: Mar. 25, 1997

[86] PCT No.: PCT/SE97/00521
§ 371 Date: Apr. 6, 1998
§ 102(e) Date: Apr. 6, 1998

[87] PCT Pub. No.: WO97/36401
PCT Pub. Date: Oct. 2, 1997

[30] Foreign Application Priority Data

Mar. 25, 1996 [SE] Sweden ................................ 9601131

[51] Int. Cl.[7] .............................. H04L 12/407; H04J 3/16
[52] U.S. Cl. ......................... 370/458; 370/437; 370/439; 370/468
[58] Field of Search ........................... 370/438, 439–440, 370/445, 449, 450, 451, 458, 465, 437, 468, 467

[56] References Cited

U.S. PATENT DOCUMENTS 5,081,623  1/1992  Ainscow .
5,121,388  6/1992  Perdikaris et al. ....................... 370/438
5,163,047  11/1992 Perdikaris et al. .
5,173,898  12/1992 Heinzmann et al. .................... 370/439
5,214,645  5/1993  Hagirahim .............................. 370/438
5,809,021  9/1998  Diaz et al. ............................... 370/364
5,852,406  12/1998 Edde et al. .............................. 370/438

FOREIGN PATENT DOCUMENTS

0428407 A2  5/1991   European Pat. Off. .
0451426 A1  10/1991  European Pat. Off. .
2281470     3/1995   United Kingdom .

OTHER PUBLICATIONS

Computer Networks and ISDN Systems, vol. 24, No. 2, Apr. 1992, pp. 119–130, "Multi–gigabit networking based on DTN", Lars Gauffin.

Journal of High Speed Networks 3, 1994, IOS Press, pp. 109–126, "The DTM Gigabit Network".

Primary Examiner—Ricky Ngo
Attorney, Agent, or Firm—Skjerven Morrill MacPherson LLP

[57] ABSTRACT

The present invention relates to a method and an arrangement for dynamic signalling in a network, such as a Dynamic Synchronous Transfer Mode (DTM) network. The network's bandwidth is divided into cycles, which in turn are divided into control slots for control signalling and data slots for transferring data. Preferably, each or certain nodes have a node controller, which control the access to slots. According to the invention data slots are converted into control slots, called dynamic control slots, or control slots are converted into data slots in order to change the signalling capacity of a node. The dynamic control slots may be used for point-to-point, multicast or broadcast signalling.

33 Claims, 4 Drawing Sheets

METHOD AND ARRANGEMENT FOR DYNAMIC SIGNALLING

TECHNICAL FIELD OF INVENTION

The present invention relates to a method and an arrangement for dynamic signalling in a time multiplexed network, such as a Dynamic Synchronous Transfer Mode (DTM) network.

DESCRIPTION OF RELATED ART

DTM is a broadband network architecture (see e.g. "The DTM Gigabit Network" by Christer Bohm, Per Lindgren, Lars Ramfelt and Peter Sjödin, published in Journal of High Speed Networks, Vol. 3, No. 2, pp. 109–126, 1994, and "Multi-gigabit networking based on DTM" by Lars Gauffin, Lars Hakansson and Björn Pehrson, published in Computer Networks and ISDN Systems, Vol. 24, No. 2, pp. 119–139, April, 1992).

DTM is a circuit switched network intended to be used in public networks as well as in local area networks (LAN's). It uses channels as the communication abstraction. The channels differ from telephony circuits in various ways. First, the establishment delay is short so that resources can be allocated/reallocated dynamically as fast as user requirements change. Second, they are simple and so minimise overhead when the communication is unidirectional. Third, they offer multiple bit-rates to support large variations in user capacity requirements. Finally, they are multicast, allowing several destinations.

DTM channels share many beneficial properties with circuits. There is no transfer of control information after channel establishment, resulting in very high utilisation of network resources for large data transfers. Support of real-time traffic is natural; there is no need for policing, congestion control or flow control within the network. The control information is separated from data information, making the data flow swiftly through the network without being manipulated in network switches. The switching delay is negligible (i.e. less than 125 $\mu$s) and there is no potential for data loss because of buffer overflow as in ATM (ATM—Asynchronous Transfer Mode). Bit error rates depend on the underlying media technologies, and switches are simple and fast due to strict reservation of resources at channel setup. DTM can show good performance in areas where traditional circuit-switched networks fall short: dynamic bandwidth allocation, channel establishment delay, and as shared media networks.

The basic topology of a DTM network preferably comprises a bus with two unidirectional optical fibers connecting all nodes, but can also be realised by any other kind of structure, e.g. a ring or hub structure. The DTM medium access protocol is a time-division multiplexing scheme. The bandwidth of the bus is divided into 125 $\mu$s cycles, which in turn are divided into 64-bit time slots. The number of slots in a cycle thus depends on the network's bit-rate.

The time slots are divided into two groups, control slots and data slots. Control slots are used to carry messages for the network's internal operation. The data slots are used to transfer user data.

Generally, in each network node there is a node controller, which preferably controls the access to data slots and performs network management operations.

Control slots are used exclusively for messages between node controllers. Each node controller preferably has write permission to at least one control slot in each cycle that it uses to broadcast control messages to other nodes. Here, broadcast refers to sending information to all downstream nodes on a bus as the transmission medium is unidirectional. Since write access to control slots is exclusive, the node controller has always access to its control slots regardless of other nodes and network load.

However, if there are many nodes on the same bus, the signalling overhead represented by the control slots may constitute a large part of the total capacity. It is therefore desirable to keep the control signalling capacity as low as possible. On the other hand, the control signalling capacity determines much of the performance of the network, both for access delay and utilisation. During periods of much control signalling, it is consequently advantageous to have a high control signalling capacity. Also, the control signalling demands vary significantly between different nodes and may also vary in time for one single node.

SUMMARY OF THE INVENTION

The object of the invention is to optimise the use of control slots and data slots in a network, such as a DTM network, whose bandwidth is divided into cycles, which in turn are divided into control slots for control signalling and data slots for transferring user data. It is desirable to have a high bandwidth for data communication and a high capacity for control signalling when requested.

This is accomplished with a method, a controller, a node and a network according to the claims below. Hence, according to the invention, there are provided means for dynamical adjustment of the control signalling capacity of a node depending on its control signaling needs.

In the dynamic signalling concept, the signalling capacity of a node is increased by the conversion of data slots into control slots, which may be called dynamic control slots, and is decreased by the conversion of control slots, preferably said dynamic control slots, into data slots.

In a preferred embodiment, one slot per cycle or at least one slot per n'th cycle (n is preferably chosen between 1 and the number of nodes on the DTM bus), called a static control slot, is left unconverted.

When data slots are converted into control slots related to a node, also all of the relevant downstream nodes may be informed about the conversion through status messages sent in the static control slot.

As a measure for deciding whether or not a node should convert data slots to control slots or vice versa, the length of a queue for outgoing control slots in the node may be used.

The converted slots can be used for either point-to-point, multicast or broadcast signalling. This dynamic signalling concept can be combined with a slot reuse method to enable simultaneous control signalling and user data transmission in the same slot over disjointed segments of a bus or a ring.

Consequently, according to the invention, the problems mentioned above are avoided by dynamically optimising the control signalling bandwidth for each node.

An advantage of the invention is that it provides a simple and easily implemented mechanism, which strongly improves the performance of the network, especially at lower bit rates. If at least one slot per cycle is left unconverted as a static control slot, no hardware change to the original prototype implementation is needed.

A further advantage of the invention is that by minimising the control signalling overhead, more nodes can be connected to each bus or ring.

Yet another advantage is that any kind of equipment can be connected to the network independently of its signalling needs.

Still another advantage of the invention is that, when dynamic control slots are used for signalling to one or several other nodes, the load on the rest of the nodes does not increase.

Yet another advantage is that an improved bandwidth utilisation is achieved when combined with a slot reuse method.

Further aspects and features of the invention will be apparent from the accompanying claims and the description below.

BRIEF DESCRIPTION OF THE DRAWINGS

Exemplifying embodiments of the invention will be described in greater detail below with reference to appended drawings, in which.

DETAILED DESCRIPTION OF THE INVENTION

First, the Dynamic Synchronous Transfer Mode Medium Access Control (DTM MAC) type of protocol will be described with reference to FIGS. 1 and 2.

Figure 1:
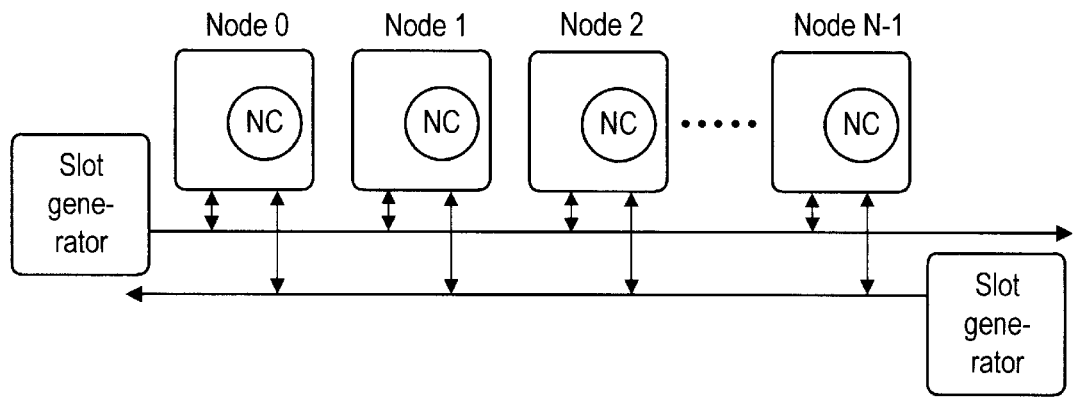
FIG. 1 schematically illustrates a dual-bus DTM network.

An example of a basic topology of a DTM network is a bus with two unidirectional optical fibers connecting all nodes, as shown in FIG. 1. Several buses with different bit-rates may be connected to form an arbitrary multi-stage network. In the current prototype implementation, buses can be combined into a two-dimensional mesh. A node at the junction of two buses can synchronously switch data slots between the two buses. This allows for efficient switching with constant delay through the node. The primary communication abstraction in DTM is a multi-rate, multicast channel.

Figure 2:
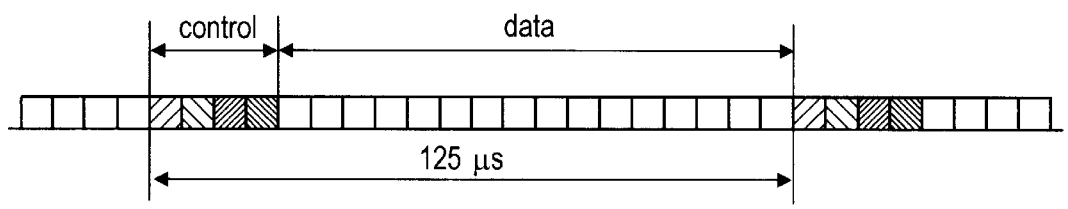
FIG. 2 schematically illustrates a DTM 125 µs cycle with data slots and control slots.

The DTM medium access protocol is a time-division multiplexing scheme, as is shown in FIG. 2. The bandwidth of the bus is divided into 125 µs cycles, which in turn are divided into 64-bit time slots (or slots for short). The number of slots in a cycle thus depends on the network's bit-rate; for instance, on a 6.4 Gbit/s network there are approximately 12500 slots per cycle.

In the DTM protocol, control information is separated from data. By using this kind of out-of-band control signalling, the demand for processing incoming data at high speed decreases, i.e. messages that contain control information can directly be forwarded to the protocol processing unit in the receiving node without having to process incoming data aimed for an end unit. To accomplish this, the slots are logically divided into two groups, control slots and data slots.

Control slots are used to carry messages for the network's internal operation, such as messages for channel establishment, channel release and bandwidth reallocation. The data slots are used to transfer user data and are not interpreted by intermediate network nodes. Intermediate nodes are nodes between the source node and the destination node or nodes.

In each network node there is preferably a node controller NC, which controls the access to data slots by creating and terminating channels on demand from users. Also, the node controller NC performs network management operations, such as network start-up and error recovery, both in response to user requests and in the background.

Control slots are used exclusively for control messages between node controllers. Each node controller preferably has write permission to at least one control slot in each cycle, which it uses to broadcast control messages downstream to other nodes. The write access to control slots is exclusive and hence, the node controller always has access to its control slots regardless of other nodes and network load. However, if for example a node is provided for read purposes only, it need not be neccesary to give the node write access to control slots.

According to an exemplifying scheme of operation, each node is initially assigned a predefined number (one or more) of control slots, called static control slots, at start-up. If there is more than one control slot available to a node, its control slots may be evenly spread over the frame to get a low average access delay to control slots, since a node that shall transmit a control message must wait for a control slot to pass the node. With evenly distributed control slots the average delay will be smaller.

The signalling capacity of a node is determined by the number of control slots it possesses, which normally is constant. This is, however, not always an optimal choice. For instance, if there are many nodes on the same bus, the control signalling overhead represented by the control slots may constitute a large part of the total network capacity. It is therefore desirable to keep the control signalling capacity as low as possible.

On the other hand, the control signalling capacity determines much of the performance of the network, both for access delay and utilisation. During periods of much control signalling, it is consequently advantageous to have a high control signalling capacity. Also, the control signalling demand varies significantly between the nodes depending on the equipment attached thereto. The control signalling demand may also for one node vary in time. For instance, during day time, office equipment is active while most home equipment is inactive. During nights, the opposite is true.

According to the invention, it is possible in for example a DTM network to dynamically change the control signalling capacity individually for each node, i.e. it is possible to change the number of control slots assigned to each node during network operation. This is referred to as dynamic signalling.

According to the invention, dynamic signalling provides means to increase the control signalling capacity of a node through converting data slots to control slots and to decrease the control signalling capacity of a node by converting control slots to data slots. The data slots converted to control slots are called dynamic control slots. Preferably, but not neccessarily, the static control slots are always left unconverted.

The allocation is performed by allocating a data slot, either a data slot already assigned to the node or for example a data slot borrowed or overtaken from another node, marking it as control slot and then informing all the downstream nodes on the bus about the allocating, which is done through special status messages sent in the node's existing control slot(s). The downstream nodes can then start to read the allocated control slot.

Outgoing control messages handled by a node are queued to be sent in a control slot. Control signalling channel overload is recognised by, e.g. the size of the queue for outgoing control slots. Consequently, when the queue is long the control signalling capacity may be increased and when the queue is short the control signalling capacity may be decreased. The number of slots to be converted may also be correlated to the queue length. Requests for conversions may also originate from the equipment attached to the node. It is also possible for example, to manually initiate the conversion and decide how many slots that are to be converted.

In the simplest implementation, the node to convert data slots selects free data slots that it has access to. In a more sophisticated implementation the node may request and convert slots that belong to another node and that may be situated, within the cycle, far from existing control slots. This is done in order to decrease the channel setup time due to lower waiting time for passing control slots.

Figure 3:
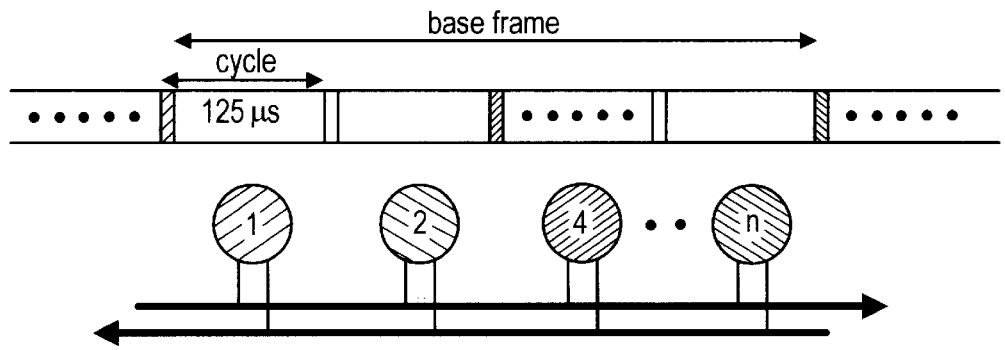
FIG. 3 schematically illustrates n nodes sharing the same control slot but on different cycles within the base frame according to the invention.

This scheme has the disadvantage that, generally, all nodes must have access to at least one static control slot per cycle. For attaching simpler terminals to the network, one slot per cycle may introduce unnecessary overhead. For large networks with many nodes connected to each bus or when the link capacity is low, this overhead can be very high. To avoid this, a solution based on base frames has been implemented. Several cycles are then organised into base frames, each consisting of n cycles, as shown in FIG. 3. The value of n is not specified, but should preferably be between 1 and the number of nodes on the bus. Then, each node preferably has access to at least one control slot per base frame and will thus have smaller control signalling capacity and longer delay for accessing but, on the other hand, the overhead is less. Dynamic control slots can then be allocated according to the invention as described above.

The slot(s) that a node possesses within the base frame is called its basic signalling channel (BSC). The n first nodes share one control slot, the n next another, etc. They share the control slot in the sense that their control slots have the same number in the cycle, but are situated in different cycles within the base frame. The capacity of the BSC's decreases and the delay to access the BSC's increases when n increases. A disadvantage with using base frames is that it requires extra hardware support since nodes need to count the cycles in a base frame. This scheme has similarities with the use of multiframes and superframes in a GSM-protocol (Group Switching Mobile protocol).

The information sent in control messages can be of many different types. Some information is specifically directed to a set of receivers while other information is more general. For example, information for setting up a channel generally only concerns the sender, the receivers and intermediate nodes. This type of control information is normally most efficiently supported by point-to-point or selected multicast channels, while more general information, such as status information or queries for mobile terminals, may be best supported by broadcast channels. It is therefore not reasonable to broadcast all control information to all hosts on a bus.

The dynamic signalling is taken one step further in the virtual network concept. This concept provides means to superimpose several logical structures on top of the underlying physical infrastructure. The network can then dynamically adapt its logical structures to for example track changing traffic conditions. Also, many different types of signalling needs can be foreseen: signalling sent to a specific node for handling a connection, e.g. in a client-server scenario, signalling to multiple nodes in a multicast scenario, e.g., to handle a teleconference, and broadcast signalling that is typically used to spread status information, e.g., routing or node state information. The virtual network signalling concept supports these different alternatives in an efficient way.

Figure 4:
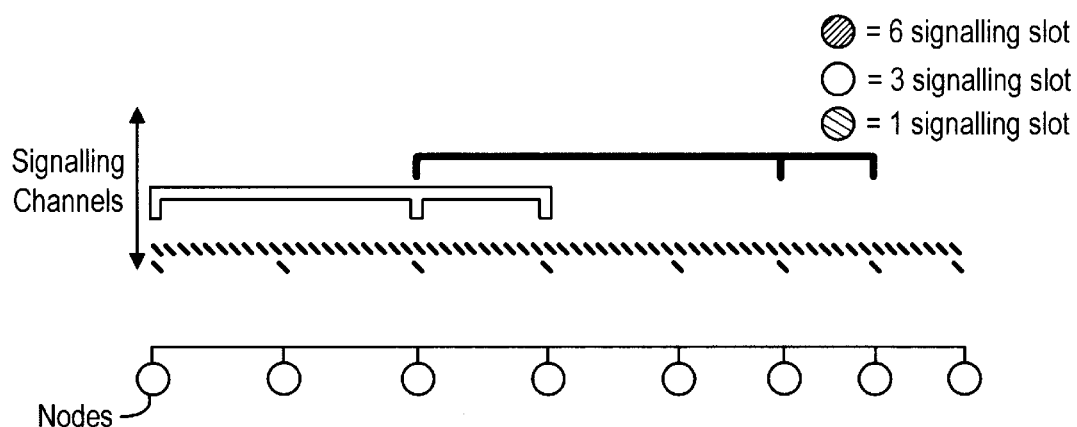
FIG. 4 schematically illustrates different signalling channels, which define different virtual networks according to the invention.

Now referring to FIG. 4, to implement the virtual network concept, the channel abstraction, i.e., point-to-point, multicast or broadcast channels, that is used for transferring data in the DTM protocol, is also applied to control signalling channels. The signalling messages are thus not broadcast as in the original DTM protocol, but are directed to one or several specific nodes. These nodes will then have their own logical control signalling channel and form a virtual network. The capacity of these signalling channels can be dynamically changed according to the demands of the nodes. Since the DTM channel concept is not restricted to a single bus, a virtual network may span several buses.

A node creates (or joins) a virtual network by signalling to the nodes with which it wants to communicate, preferably by using the basic control signalling channel (BSC). The control slot specifies which data slots will be used for signalling within the virtual network. The incoming slots that belong to this signalling channel will be attached to a local logical channel similar to the logical channels used for data in the node. A node may join several virtual networks and will therefore have many different incoming and outgoing signalling channels that are associated with different virtual networks, as shown in FIG. 4.

The virtual network concept further makes it possible to allocate resources strictly for the nodes attached to the virtual network. The nodes that belong to this network may then reallocate the slots among themselves, according to the slot allocation algorithm used. It is thus possible to use different slot allocation algorithms for different types of traffic. The concept provides functionality for, e.g., group communication.

Figure 5:
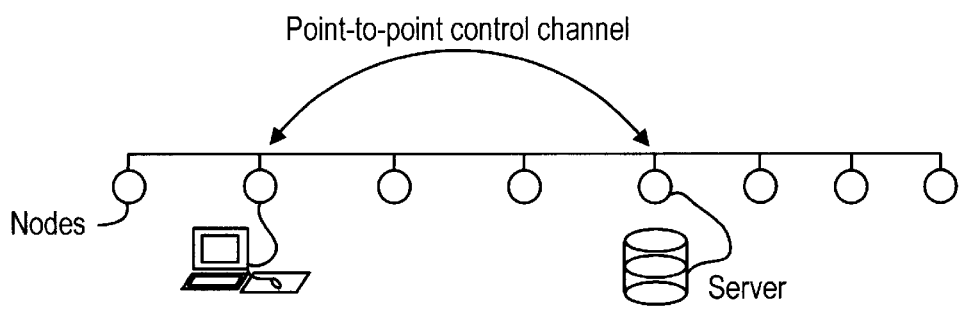
FIG. 5 schematically illustrates a point-to-point signalling channel according to the invention.

Virtual networks have the largest benefits in access networks, where nodes communicate sporadically. For instance, when a video monitor is switched off or a workstation is idle, the need for control signalling is very small. In that case, the node may only use the BSC. When a workstation is used, it often communicates with its server. Since the traffic from computers usually is bursty, there is a need for more control signalling capacity between the workstation and the server. For this sake, it may establish a point-to-point signalling channel to the server, as shown in FIG. 5. During for example a teleconferencing session, a virtual network may temporarily be created between the nodes participating in the conference. The signalling capacity is thus allocated according to the current demands of the involved nodes. Nodes not attached to the virtual network are unaffected by the increase in control signalling.

This concept has similarities to the signalling virtual channels (SVC's) used in the Asynchronous Transfer Mode protocol (ATM). There is one meta-signaling virtual channel (MSVC) per interface that is permanent. Also, there are several other types of signalling virtual channels that are allocated between signalling end-points while they are active.

The dynamic signalling concept can be combined with a slot reuse method to further improve the bandwidth utilisation. Nodes are connected by bus segments and signalling channels using static or dynamic control slots for point-to-point or multicast signalling and use only a subset of the segments on the bus, the remaining segments being reserved but left unused and thus wasting shared resources. A better alternative is to let the signalling channels only reserve capacity on the network segments between the source and the destinations), and thus only data slots on these segments are converted into control slots. The data slots on the rest of the segments are left unconverted and hence other nodes are enabled to use these slots for data transmission or to convert them into control slots for their signalling purposes. A single slot may in this case be used multiple times on the bus, both as a (dynamic) control slot and as a data slot. Slot reuse enables, consequently, simultaneous signalling and data transmission in the same slot over disjointed segments of the bus.

Results from simulations will be described in the following. The required signalling capacity depends on the size of the transfers. Obviously, for a given load, small transfers imply many channel creations. Instead of having a large permanent signalling overhead and dimension the signalling capacity for the worst case situation, it is natural to dynamically adjust the number of control slots according to the current load. In the simulations there are an upper and lower bound for the number of control slots per node. The upper bound is there since when the amount of control slots increases over a certain level, the NC processor is the limiting factor in its capacity of sending control messages. The lower bound exists to avoid that a node reallocates too many control slots, which will result in longer channel setup times due to waiting time for passing control slots.

The number of control slots for the node is then adjusted by recording the access time to control slots. If the access time exceeds the time of q frames, the signalling capacity is increased and if the access time decreases below one frame, the signalling capacity is decreased. Practically, the access time may be measured as the queue length for outgoing control messages. The dynamic signalling mechanism is most important in an access network. Also, the affect is larger in networks with many nodes. Therefore, the transmission capacity, for this simulation, is low and the number of nodes is high. The number of slots in the cycle is set to 1200, which corresponds to a link capacity of 611 Gbit/s and the network has 40×40 nodes. Some of the nodes are defined as hot-spots, i.e., they need a much higher signal capacity then the rest of the nodes. Status messages that announce allocation of control slots have higher priority than other control messages.

Figure 6:
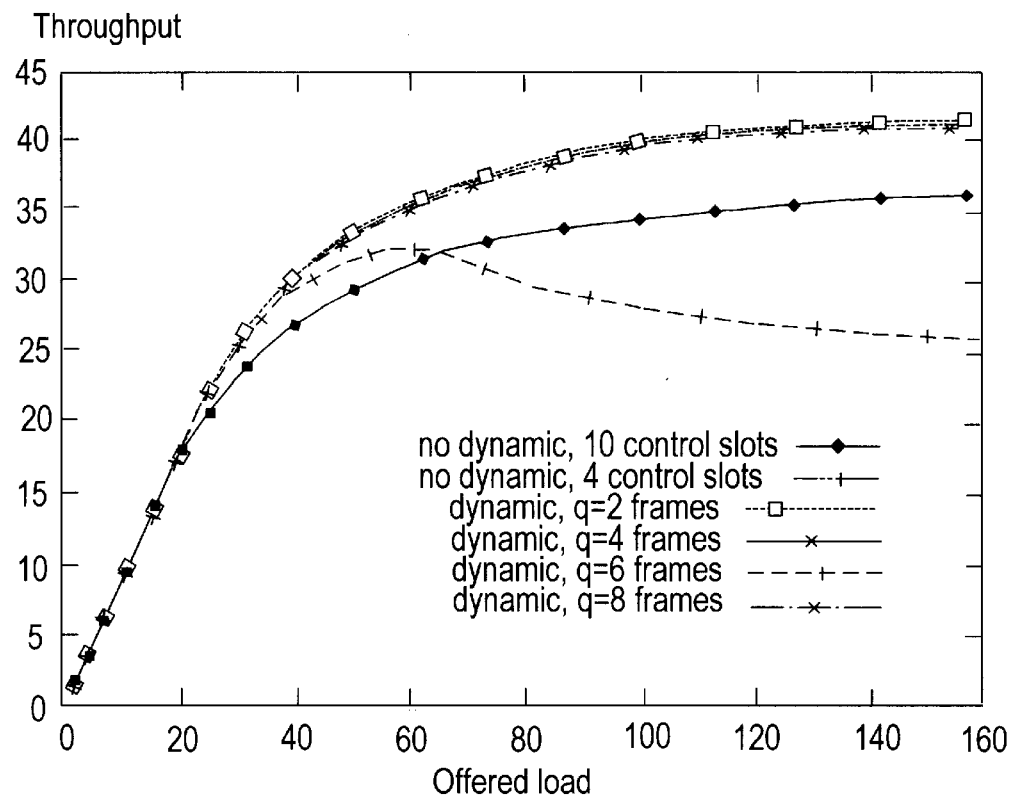
FIGS. 6–9 schematically illustrate results from simulations where dynamic signalling is included.
Figure 7:
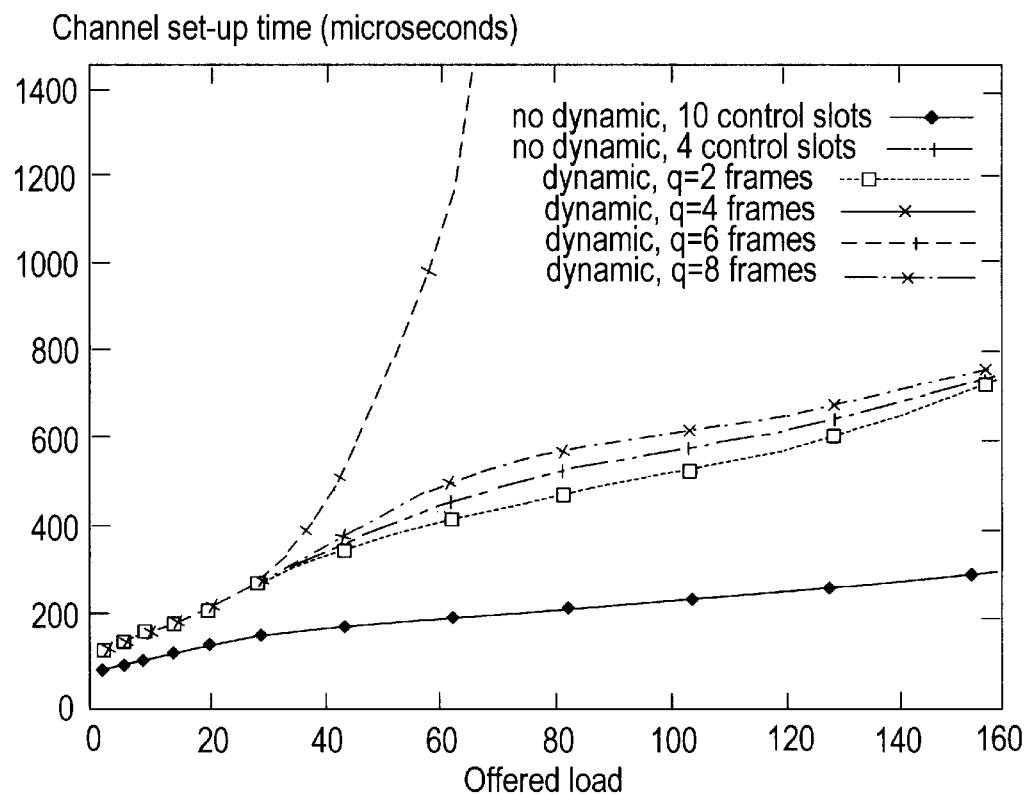

In FIG. 6 and in FIG. 7, results are shown from the simulations in terms of throughput and channel setup versus offered load. The dynamic control slot assignment is compared with the static case with the upper and lower bounds assigned. The lower bound is here set to 4 slots per cycle and the upper bound is set to 10 slots per cycle. The value of q is set to 2, 4, 6 and 8 frames, respectively.

For the upper bound the overhead from the control slots will constitute a large part of the total number of slots which will reduce the throughput. However, the mean access time is low. For the lower bound the queues start to grow for higher loads and thus the channel setup time will increase and the throughput decrease. As can be seen from FIG. 6, a slightly better performance is obtained when q=2. This since the response on increasing queue length is faster and thus the channel setup time will be low. The mechanism shall cope with long term requirements for higher signalling. As can be seen in FIG. 7 the mechanism is made active for offered loads higher than approximately 20%.

Figure 8:
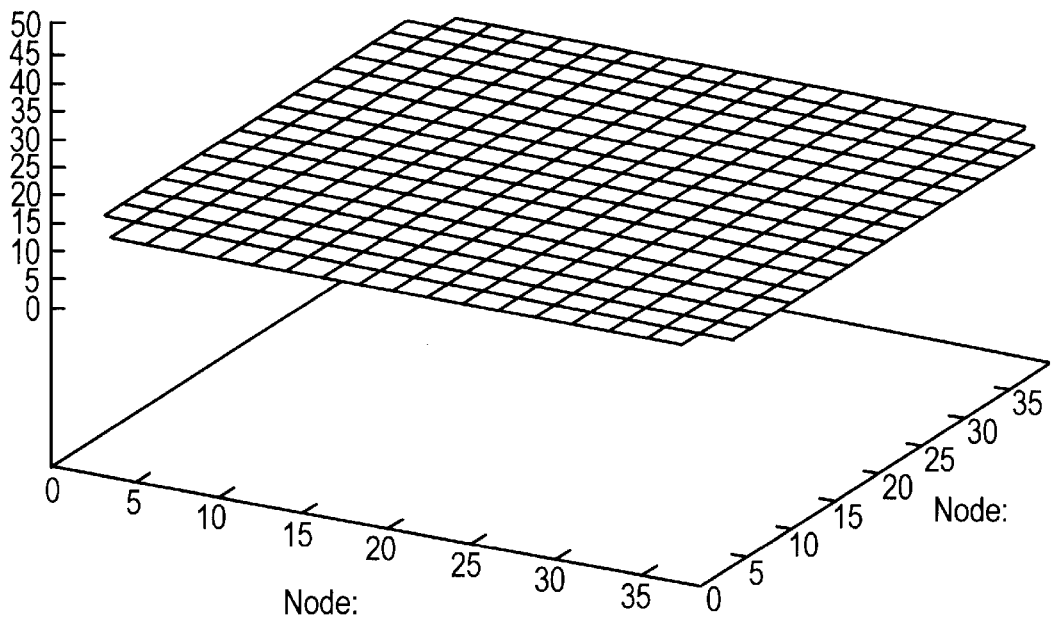
Figure 9:
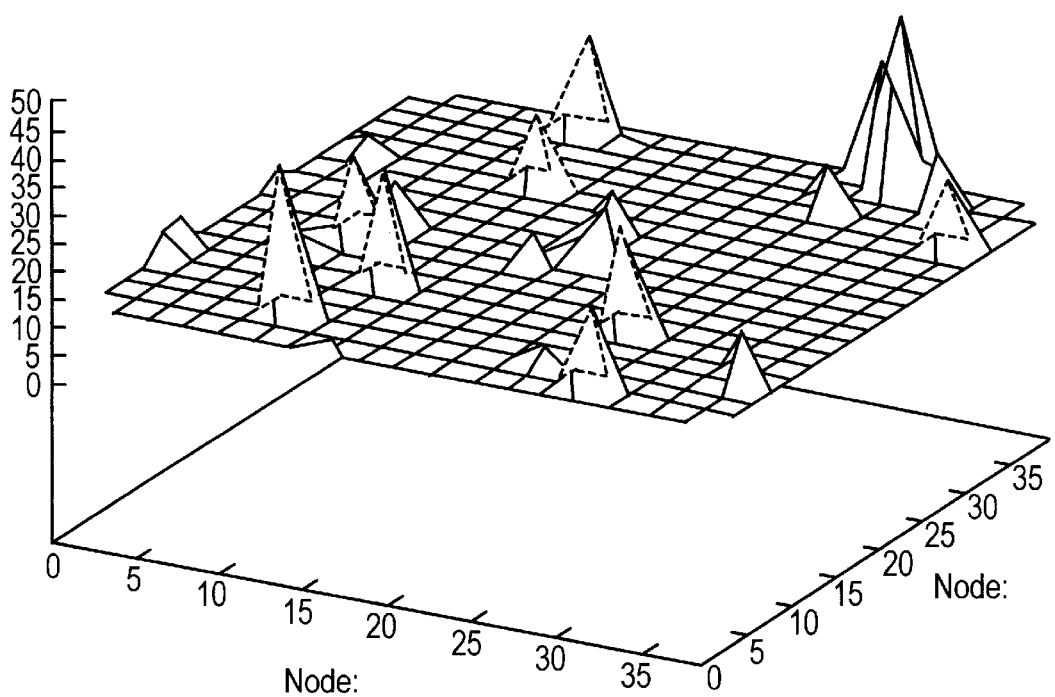

In FIG. 8 and in FIG. 9, the number of control slots assigned to each node are shown at start-up after approximately 500 $\mu$s of operation. As can be seen in FIG. 9, the number of allocated control slots varies but many hot spots can be recognised. In general, the nodes close to the edges of the network will not be assigned the same number of control slots since upper bound limits the number of control slots for one bus. An improvement of the scheme would be to relate the upper and lower bounds to the location on the bus or to the total number of control slots for a node.

The method and arrangement for dynamic signalling according to the invention adjust dynamically the control signalling bandwidth for each node to its needs. An advantage of the invention is that it is a simple mechanism, which strongly improves the performance of, for example, a DTM network. If at least one slot per cycle is left unconverted as a static control slot, no hardware change to the prototype implementation is needed.

By minimising the signalling overhead according to the invention, more nodes may be connected to the bus. Any kind of equipment may be connected to the network independently of its signalling needs. Combined with a slot reuse method, the bandwidth utilisation is further improved.

The network is not restricted to one dual-bus or several dual-buses, but can be realised by other kinds of structures, e.g., ring or hub structures with an arbitrary number of nodes. The transmission media can, besides optical fibers, be coaxial cables or any other high bandwidth transmission media. The bandwidth of the DTM dual bus in the preferred embodiment is divided into 125 $\mu$s cycles, which in turn are divided into 64-bit time slots. The invention is not restricted to DTM networks with these values, but can be used in networks with cycles and slots of arbitrary sizes.

What is claimed is:

1. A method for dynamic signalling in a network having a plurality of nodes and a bandwidth, said method comprising:

dividing said bandwidth into a plurality of time-sequential cycles;

dividing said plurality of time-sequential cycles into control slots for network control signalling and data slots for transferring data; and converting data slots into control slots or converting control slots into data slots in order to change the signaling capacity of a node.

2. A method according to claim 1, wherein said data slots converted into control slots are called dynamic control slots, and wherein only said dynamic control slots may be converted into data slots.

3. A method according to claim 1, wherein said method is implemented in a Dynamic Synchronous Transfer Mode (DTM) network.

4. A method according to claim 1, wherein at least one slot per cycle, called static control slot, is left unconverted when converting control slots into data slots related to said node.

5. A method according to claim 1, wherein at least one slot, called static control slot, every n'th cycle is left unconverted when converting control slots into data slots related to said node, the value of n being preferably selected as an integer value from one to the total number of nodes in said network.

6. A method according to claim 5, wherein said cycles are counted in order to localise said static control slot related to said node.

7. A method according to claim 5, wherein the respective static control slots related to different nodes are arranged in the same position within the cycle but in different cycles within a frame.

8. A method according to claim 1, further comprising informing downstream nodes about said conversion related to said node.

9. A method according to claim 1, further comprising using the length of a queue for outgoing control slots related to said node, said queue representing the control slot demand, as a measure for deciding whether or not data slots shall be converted into control slots, related to said node, or vice versa.

10. A method according to claim 1, further comprising using the length of a queue for outgoing control slots related to said node, said queue representing the control slot demand, as a measure for deciding how many data slots that shall be converted into control slots, related to said node, or vice versa.

11. A method according to claim 1, further comprising selecting a data slot that said node has access to as the slot to be converted into a dynamic control slot related to said node.

12. A method according claim 1, further comprising selecting a data slot that a second node has access to as the slot to be converted into a dynamic control slot related to a first node.

13. A method according to claim 1, further comprising using said data slots converted into control slots for point-to-point control signalling.

14. A method according to claim 1, further comprising using said data slots converted into control slots for multi-cast control signalling.

15. A method according to claim 1, further comprising using said data slots converted into control slots for control signalling between at least two nodes on a common logical control signalling channel thus forming a virtual network.

16. A method according to claim 15, further comprising using said dynamic control slots for allocating bandwidth to nodes attached to the virtual network.

17. A method according to claim 15, further comprising connecting nodes on different buses to the same virtual network.

18. A method according to claim 15, further comprising connecting a node to a virtual network while being connected to at least one other virtual network.

19. A method according to claim 1, further comprising said method being combined with a slot reuse method in such a way that data slots are converted into control slots, or vice versa, only on segments connecting communicating nodes, a segment being the part of the transmission medium that connects a node to another node, leaving the same slots on other segments of the network unconverted, and thus enabling other nodes to use these slots for data transmission or to convert them into control slots or vise versa.

20. A controller for a network containing at least two nodes, the network having a bandwidth divided into cycles, each cycle containing a plurality of slots, the controller comprising:
means for dividing the plurality of slots into control slots for control signalling and data slots for transferring data, and
means for converting data slots into control slots and/or converting control slots into data slots in order to change the signalling capacity of a node.

21. A controller according to claim 20, wherein said controller is located in a node of a Dynamic Synchronous Transfer Mode (DTM network.

22. A controller according to claim 20, wherein said controller is arranged to leave at least one slot per cycle or one slot per n'th cycle, called static control slot, unconverted when converting control slots into data slots related to said node.

23. A node in a network, said node comprising:
a bandwidth divided into a plurality of sequential cycles, each cycle divided into control slots for control signalling and data slots for transferring data; and
a node controller arranged to convert data slots into control slots and/or to convert control slots into data slots in order to change the signalling capacity of said node.

24. A network comprising:
a bandwidth divided into a plurality of sequential cycles, each cycle divided into control slots for control signalling and data slots for transferring data; and
a plurality of nodes, wherein at least one of the nodes comprises a node controller arranged to convert data slots into control slots and/or to convert control slots into data slots in order to change the signalling capacity of said node based on the queue length of control signals to be placed in outgoing control slots.

25. A method according to claim 2, wherein said method is implemented in a Dynamic Synchronous Transfer Mode (DTM) network.

26. A method according to claim 2, wherein at least one slot per cycle, called static control slot, is left unconverted when converting control slots into data slots related to said node.

27. A method according to claim 3, wherein at least one slot per cycle, called static control slot, is left unconverted when converting control slots into data slots related to said node.

28. A method according to claim 2, wherein at least one slot, called static control slot, every n'th cycle is left unconverted when converting control slots into data slots related to said node, the value of n being preferably selected as an integer value from one to the total number of nodes in said network.

29. A method according to claim 3, wherein at least one slot, called static control slot, every n'th cycle is left unconverted when converting control slots into data slots related to said node, the value of n being preferably selected as an integer value from one to the total number of nodes in said network.

30. A method according to claim 6, wherein the respective static control slot related to different nodes are arranged in the same position within the cycle but in different cycles within a frame.

31. A method according to claim 16, further comprising connecting nodes on different buses to the same virtual network.

32. A method according to claim 16, further comprising connecting a node to a virtual network while being connected to at least one other virtual network.

33. A method according to claim 17, further comprising connecting a node to a virtual network while being connected to at least one other virtual network.

* * * * *